June 1, 1954
F. J. KENT ET AL
2,679,748
TUBE TESTING MACHINE
Filed Aug. 5, 1950
2 Sheets-Sheet 1
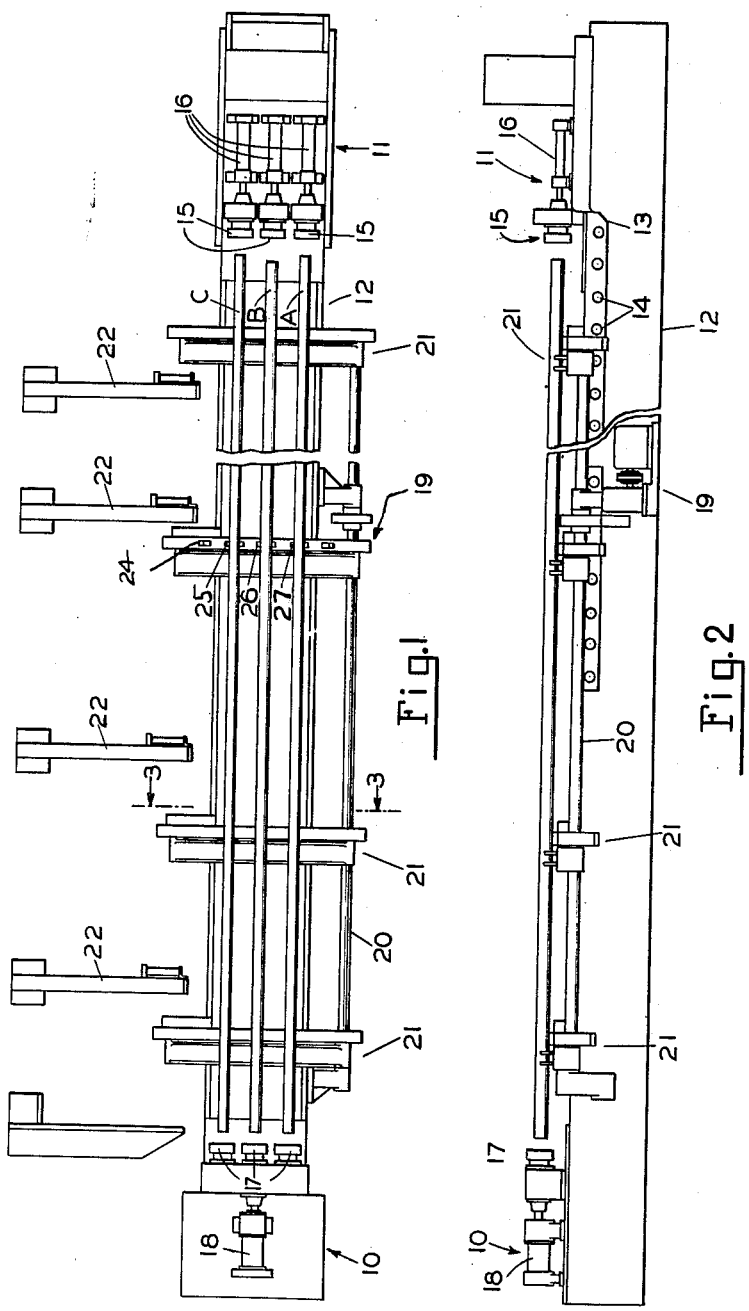
INVENTORS
FRANCIS J. KENT
BY FRED A. DUSSLING
Pollard by Johnston
ATTORNEYS June 1, 1954
F. J. KENT ET AL
2,679,748
TUBE TESTING MACHINE
Filed Aug. 5, 1950
2 Sheets-Sheet 2
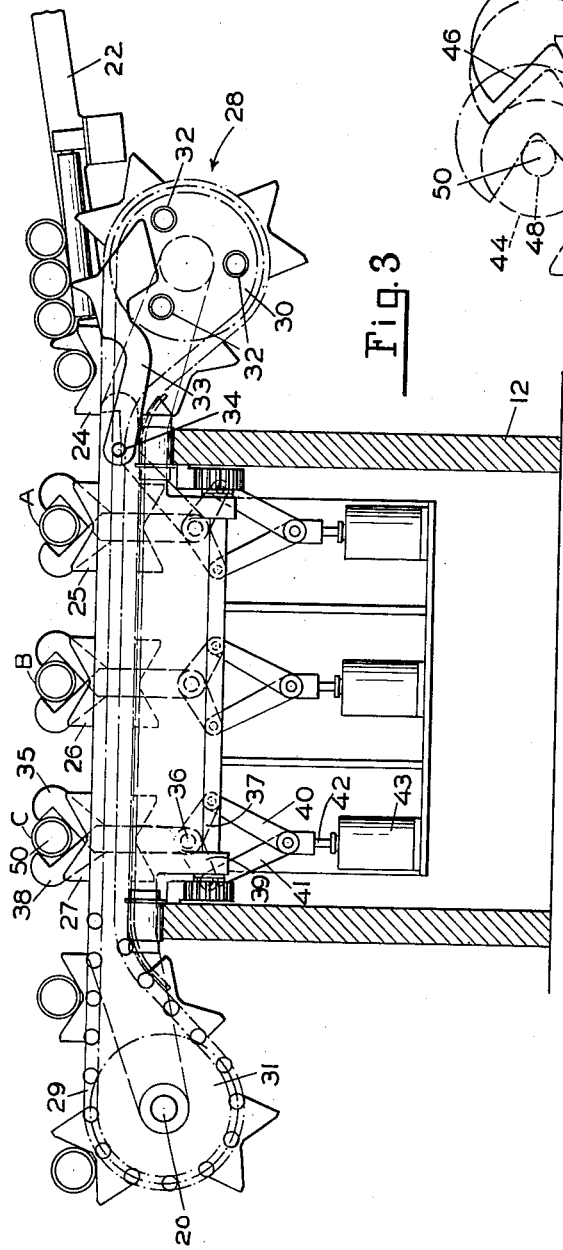
INVENTORS
FRANCIS J. KENT
BY FRED A. DUSSLING
Pollard and Johnston
ATTORNEYS

Patented June 1, 1954

2,679,748

UNITED STATES PATENT OFFICE 2,679,748

TUBE TESTING MACHINE

Francis J. Kent, Forest Hills, and Fred A. Dussling, Valley Stream, N. Y., assignors to Hydropress, Incorporated, New York, N. Y., a corporation of Delaware Application August 5, 1950, Serial No. 177,902

5 Claims. (Cl. 73—41)

This invention relates to testing machines and particularly to an automatic loading and clamping mechanism suitable for use in hydraulic tube testing apparatus or the like.

In the manufacture of pipes or tubes, it is necessary to test the same for leaks and mechanical strength. In one aspect, this can be accomplished by suitably sealing the ends of the tube by movable sealing heads, introducing water to the inside of the tube after the heads are in sealing relationship therewith, then exerting a high internal pressure on the tube. The tubes involved vary in length and diameter, but for a single operation in a machine testing a plurality of tubes at a time, only one diameter and length normally will be encountered. In previous devices, the tubes normally have been put into testing position and aligned with the sealing heads by manual means or by reciprocating loading devices.

One of the objects of the invention is to feed and to position a plurality of tubes accurately relative to a plurality of sealing heads.

Another object of the invention is to provide a clamping and positioning arrangement which will operate within certain limits to properly position the tube at the correct height regardless of the tube diameter.

In a preferred arrangement, the loading and unloading device may comprise an endless conveyor having tube receiving means thereon, such as saddles, adapted to receive the tubes from a suitable feed or escapement apparatus. A clamping and positioning mechanism is provided for operation at an appropriate time to clamp the pipe and to raise it above its saddle to the proper position relative to the center lines of the sealing head means. The clamping mechanism can include a pair of pivoted arms having opposed jaws with faces of correct angular profile properly located relative to the pivot or fulcrum point of the jaw clamps to raise a tube to the desired center. Upon completion of the hydraulic test, the clamping jaws can be opened so as to again deposit tubes upon their saddles and the endless chain conveyor again can be started so that it will remove the tubes from the machine. The clamping and conveyor means can be used with a single tube or any number of tubes according to the machine organization involved.

These and other objects, advantages, and features of the invention will become apparent from the following description and drawings.

In the drawings:

Figure 1 is a diagrammatic plan view of one form of machine with which the invention can be used, the view being broken for convenience.

Figure 2 is a side view of Figure 1.

Figure 3 is an enlarged sectional view of the feed mechanism looking in the direction 3—3 of Figure 1.

Figure 4 is a fragmentary plan view of one of the left hand clamping arrangements of Figure 3.

Figure 5 is an enlarged side view of one of the clamping arms showing it in various positions.

Referring to Figure 1, a three tube testing machine is illustrated having a stationary housing 10 and an adjustable housing 11. The adjustable housing may be moved along frame 12 of the testing machine and locked in place by means of an appropriate locking mechanism 13 (Fig. 2) and the selection of the desired locking aperture 14 in the frame. The movable housing sealing heads 15 may be reciprocable by means of the hydraulic motor arrangement 16. Stationary housing sealing heads 17 can be fixed or can be movable by the hydraulic motor 18. In the particular form illustrated, three sealing heads are shown, it being understood that one or more can be employed. The sealing heads, may be of the plate type, the inside sealing type, or the outside sealing type as desired.

The loading mechanism is shown schematically at 19 (Figs. 1 and 2), there being a shaft 20 connecting loading mechanism 19 with load mechanisms 21, 21 located along the frame of the machine. Pipes are fed down chutes 22 (Figs 1, 2, and 3) onto the appropriate tube holding means as saddles 24, 25, 26, 27 by means of the escapement mechanism 28 (Fig. 3). The saddles are mounted on the endless conveyor means or roller chain 29. The chain is carried on sprockets 30 and 31 and the diameters thereof so chosen that one revolution of the sprockets will result in a forward motion of exactly the distance to properly index the three tubes into a testing location aligned with the sealing heads or in a vertical plane through the sealing head axes.

Mounted on the side of sprocket 30 are three rollers 32 spaced 120° apart for the purpose of actuating the escapement lever arm 33, the escapement lever arm 33 being pivoted at 34 to the frame 12 of the machine. The rollers will serve to release one tube at a time onto one of the saddles 24 as the saddle is in a position to receive the tube.

On the completion of one complete revolution of sprocket 30, the sprocket is brought to a stop and the three tubes will be located in the vertical planes in which the center lines of the appropriate sealing heads are located but they will not be at the horizontal axes of said heads.

The clamping and positioning means will be described for one of the units, the remainder being similar thereto. Clamping jaw 35 of the right hand lever (Fig. 3) is pivoted on shaft 36 carried by the frame of the machine, said lever being in the form of a bell crank having an arm 37 (Figs. 3 and 5). The left hand lever (Fig. 3) may have jaw means 38 comprising jaw elements 38A, 38B (Fig. 4) arranged to straddle jaw element 35. The left hand lever is pivoted on shaft axis 36 and has an arm 39. Arms 37 and 39 are pivotally connected to links 40, 41, respectively, which in turn are connected to piston rod 42 of hydraulic motor 43.

When the pipes are being loaded onto the machine, the piston rod 42 will be moved downwardly so that the jaws will pivot on shaft 36 and move completely out of the way of the line of travel of tubes A, B, and C such as illustrated at 51 in Figure 5.

Assuming, for example, that pipe 44 in Figure 5 is to be gripped, the jaw operating hydraulic motor is energized so that the jaws 35, 38A and 38B come together, only jaw element 35' being shown in Figure 5 corresponding to jaw element 35 of Figure 3, the other jaws being similarly appropriately shaped and arranged according to whether a right or left hand lever is involved. The sloping faces 45 and 46 of the jaw elements are designed so that they will pick-up, for example, the tube 44 (Fig. 5) from saddle 27' and move it upwardly so that its center will coincide with center 50 of the testing head involved. As can be seen in Figure 5, the relationship between fulcrum point or center of shaft 36' and jaw faces is so chosen that regardless of the size of tube resting on the saddle, the tube will be raised to the proper center or horizontal plane. As an example, the small tube 47 resting on saddle 27' will be raised to the position 48 illustrated with its center at 50.

Upon completion of testing, the sealing heads can be retracted and the clamping mechanism lowered redepositing the tubes on their respective saddles. The conveyor mechanism again can be operated moving the tested tubes to a suitable unloading apparatus and another set of tubes moved into position for the next testing operation.

Geneva motion mechanism can be connected to the sprocket 30 to provide uniform acceleration and deceleration. This will avoid any abrupt action of the chain 29 which might tend to dislodge the tubes from their saddles as they are carried toward their predetermined position relative to their sealing heads.

As mentioned previously, the testing machine may require varying numbers of automatic loading and clamping mechanisms located along the frame depending upon the length thereof and these may be similar to means 19. It also should be evident that the particular conveying and loading or positioning apparatus can be used in machines other than tube testing.

Details of construction, of course, can be varied without departing from the spirit of the invention except as defined in the appended claims.

What is claimed is:

1. In a tube testing machine conveyor or the like, the combination comprising conveyor means movable transversely of the axis of the machine, tube receiving means on said conveyor means for moving tubes from a feed point to a position in a vertically aligned plane at a predetermined station, movable arms having confronting notches with the notches of each arm having upper and lower surfaces angularly disposed to the path of movement of the arm, means actuating the arms for moving the lower surfaces towards each other so that such surfaces act as cam surfaces to lift a tube on said tube receiving means upwardly until said upper surfaces are contacted by the tube so as to position and clamp said tube with its center line in a predetermined position above said tube receiving means.

2. In a tube testing machine conveyor for a testing machine having a plurality of testing stations, the combination comprising conveyor means movable transversely of the axis of the machine, a plurality of tube receiving means on said conveyor for moving tubes from a feed station to positions aligned in vertical planes with the testing stations, and tube elevating and gripping means comprising pairs of pivoted levers having pivots, the levers of each pair having opposed notches with the notch of each lever having upper and lower surfaces angularly disposed to the path of movement of the lever, and means actuating said levers for moving the lower surfaces towards each other so that such surfaces act as cam surfaces to lift a tube on said tube receiving means upwardly until said upper surfaces are contacted by the tube so as to position and clamp said tube with its center line in a predetermined position above said tube receiving means.

3. In a hydraulic tube testing machine, the combination comprising a stationary housing and a movable housing, each of said housings having hydraulic motors carrying a plurality of sealing heads thereon, conveyor means movable transversely of the axis of the machine, a plurality of tube receiving saddles fixed on said conveyor means for moving tubes from a feed station to positions aligned in vertical planes with testing stations between said sealing heads, escapement mechanism feeding tubes to said conveyor means and moving said conveyor and saddles with tubes thereon, and relatively movable jaw members for each tube, each jaw member having opposed notch-like tube engaging portions, the notch-like portions of each being defined by angularly disposed upper and lower surfaces, the lower surfaces acting as cam surfaces for moving the tube upwardly from its saddle into alignment with a predetermined axis at said testing station, the upper surfaces then positively holding its tube in such aligned position.

4. In a hydraulic tube testing machine, the combination comprising a stationary housing and a movable housing, each of said housings having hydraulic motors carrying a plurality of sealing heads thereon, conveyor means having an endless chain movable transversely of the axis of the machine, a plurality of tube receiving saddles on said chain for moving tubes from a feed station to positions aligned in vertical planes with testing stations between said sealing heads, escapement mechanism feeding tubes to said conveyor means and connected with said chains moving said conveyor, relatively movable jaw members for each tube, each jaw member having opposed notch-like tube engaging portions, the notch-like portions of each being defined by angularly disposed upper and lower surfaces, the lower surfaces acting as cam surfaces for moving the tube upwardly from its saddle into alignment with a predetermined axis at said station, the upper surfaces then positively holding its tube in such aligned position, and means for moving the jaw members out of the path of transverse movement of the tubes.

5. A tube raising and clamping mechanism for a tube testing machine or the like, comprising a tube saddle, a pair of pivoted arms, a pivot for said arms, and opposed notch-like tube engaging portions on said arms, the notch-like portion of each arm being defined by inner and outer surfaces relative to the pivot, said surfaces being angularly disposed relative to the path of movement of the arm, said arms being movable relative to each other about said pivot so that the inner surfaces cooperate to lift a tube from said saddle outwardly away from the pivot until the outer surfaces are contacted by the tube so as to position and clamp the tube in a predetermined position above said saddle.

References Cited in the file of this patent

UNITED STATES PATENTS

| Number | Name | Date |
| --- | --- | --- |
| 1,861,113 | Coberly | May 31, 1932 |
| 1,972,630 | Neale et al. | Sept. 4, 1934 |
| 2,396,614 | Sommes | Mar. 12, 1946 |
| 2,426,095 | Hecker | Aug. 19, 1947 |
| 2,497,193 | Webb | Feb. 14, 1950 |
| 2,551,645 | Stadelman | May 8, 1951 |